US009031712B2

(12) United States Patent
Baskin et al.

(10) Patent No.: US 9,031,712 B2
(45) Date of Patent: May 12, 2015

(54) REMOTE MANAGEMENT AND CONTROL OF VEHICULAR FUNCTIONS VIA MULTIPLE NETWORKS

(75) Inventors: Lonny Baskin, Tsur Hadassah (IL); Ariel Malamud, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 196 days.

(21) Appl. No.: 13/539,352

(22) Filed: Jun. 30, 2012

(65) Prior Publication Data

US 2014/0005859 A1 Jan. 2, 2014

(51) Int. Cl.

| | |
|---|---|
| ***G05D 1/00*** | (2006.01) |
| ***G05D 3/00*** | (2006.01) |
| ***G06F 7/00*** | (2006.01) |
| ***G06F 17/00*** | (2006.01) |
| ***G07C 9/00*** | (2006.01) |

(52) U.S. Cl.

CPC .. *G07C 9/00309* (2013.01); *G07C 2009/00507* (2013.01)

(58) Field of Classification Search

USPC ............... 701/1, 2, 451, 517; 455/420, 556.1, 455/410, 414.1; 340/5.61, 425.5, 426.1, 340/5.72

See application file for complete search history.

(56) References Cited

U.S. PATENT DOCUMENTS

| | | | | |
|---|---|---|---|---|
| 5,777,580 | A * | 7/1998 | Janky et al. | 342/457 |
| 5,914,675 | A * | 6/1999 | Tognazzini | 340/989 |
| 6,909,964 | B2 | 6/2005 | Armstrong et al. | |
| 7,847,709 | B2 * | 12/2010 | McCall et al. | 340/988 |
| 8,077,011 | B2 * | 12/2011 | McBride et al. | 340/5.72 |
| 8,605,681 | B2 * | 12/2013 | Jeon et al. | 370/331 |
| 2003/0055560 | A1 * | 3/2003 | Phillips | 701/213 |
| 2003/0117293 | A1 * | 6/2003 | Tang et al. | 340/825.72 |
| 2003/0139179 | A1 * | 7/2003 | Fuchs et al. | 455/426 |
| 2004/0092253 | A1 * | 5/2004 | Simonds et al. | 455/414.2 |

(Continued)

FOREIGN PATENT DOCUMENTS

| | | | |
|---|---|---|---|
| KR | 10-2004-0092090 | A | 11/2004 |
| KR | 10-2006-0122091 | A | 11/2006 |
| WO | 2014/004745 | A2 | 1/2014 |
| WO | 2014/004745 | A3 | 2/2014 |

OTHER PUBLICATIONS

International Search Report and Written Opinion received for PCT Patent Application No. PCT/US2013/048011, mailed on Dec. 30, 2013, 14 pages.

*Primary Examiner* — Khoi Tran
*Assistant Examiner* — Jaime Figueroa
(74) *Attorney, Agent, or Firm* — Sutherland Asbill & Brennan LLP

(57) ABSTRACT

Certain embodiments herein relate to enabling remote activation of a vehicle's functions or features via multiple networks that may connect the vehicle to a user device operated by a user. A user may utilize the user device to send action codes to a vehicle that, when received and processed by the vehicle, may cause the vehicle to perform one or more functions corresponding to the action codes, in some examples, such functionality may be implemented for stolen vehicle tracking and parental controls. Various devices and/or program code in a vehicle may configured to detect and communicate multiple networks, such as Bluetooth®, a wireless fidelity (WiFi) network, a WiFi Direct network, a cellular network (including third generation and fourth generation), a radio network, a satellite, etc. As described herein, program code may run as firmware and processors and memory devices, for example, may operate out of band.

23 Claims, 9 Drawing Sheets

(56) References Cited

U.S. PATENT DOCUMENTS

| | | | | |
|---|---|---|---|---|
| 2004/0242198 | A1* | 12/2004 | Oyagi et al. | 455/411 |
| 2005/0168322 | A1* | 8/2005 | Appenrodt et al. | 340/5.72 |
| 2006/0004788 | A1* | 1/2006 | Pilgrim et al. | 707/100 |
| 2006/0227725 | A1* | 10/2006 | Huotari et al. | 370/254 |
| 2006/0267799 | A1 | 11/2006 | Mendelson | |
| 2007/0085658 | A1* | 4/2007 | King et al. | 340/5.72 |
| 2008/0294742 | A1* | 11/2008 | Huotari et al. | 709/206 |
| 2009/0140887 | A1* | 6/2009 | Breed et al. | 340/990 |
| 2010/0075655 | A1 | 3/2010 | Howarter et al. | |
| 2012/0028680 | A1* | 2/2012 | Breed | 455/556.1 |
| 2012/0124357 | A1* | 5/2012 | Zimmer et al. | 713/2 |
| 2013/0245887 | A1* | 9/2013 | Schneider et al. | 701/36 |

* cited by examiner

REMOTE MANAGEMENT AND CONTROL OF VEHICULAR FUNCTIONS VIA MULTIPLE NETWORKS

TECHNICAL FIELD

Embodiments of this disclosure relate generally to computer networking, and more particularly, to communication between a user device and a vehicle over a network.

BACKGROUND

An increasing number of vehicles may include devices that are configured for remote management and control. These devices may receive instructions from a computing device operated by an owner of the vehicle desiring to manage or control features associated with the devices. Owners may leverage such device configurations to track and control vehicles in association with preventing theft or implementing parental controls over a vehicle's operation. The extent and usability of such functionality may be limited in existing systems. For example, existing systems may be restricted to using a single network, outside of which the vehicle and the computing device may be unable to communicate to provide tracking and control of the vehicle. Additional limitations of existing systems may stem from their susceptibility of being disabled, restrictions that require vehicle configurations to be performed locally, and a limited number of vehicular functions that may be remotely managed or controlled.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein may be directed to communication between a vehicle and a computing device. A vehicle may include one or more processors, networking interfaces, and other computing devices that may enable it to communicate with a computing device, such as a personal computer or smart phone, over a network. A computing device may be utilized by a vehicle owner, for example, to manage or control a vehicle's functions in association with tracking a stolen vehicle and implementing parental controls for the vehicle, among other functions. Certain embodiments herein relate to vehicles and computing devices that may be configured to enable such management and control using multiple networks, such as a wireless fidelity (WiFi) network, a WiFi Direct network, a Bluetooth® network, a cellular network, a radio network, a satellite network, etc.

Example communication herein may include a computing device sending action codes to the vehicle that may cause the performance of respective functions or features in the vehicle associated with the action codes, such as locking doors in the vehicle, sounding an alarm in the vehicle, and turning on lights in the vehicle. According to certain embodiments herein, devices in a vehicle may be configured to perform such functions out of band, or when the vehicle has access to only a minimal amount of power, for example, when a vehicle is powered down. In such instances, devices in a vehicle may be further configured to wake other devices or components in the vehicle such that these components may perform functions corresponding to received action codes. Numerous examples of such functionality are provided below.

Figure 1:
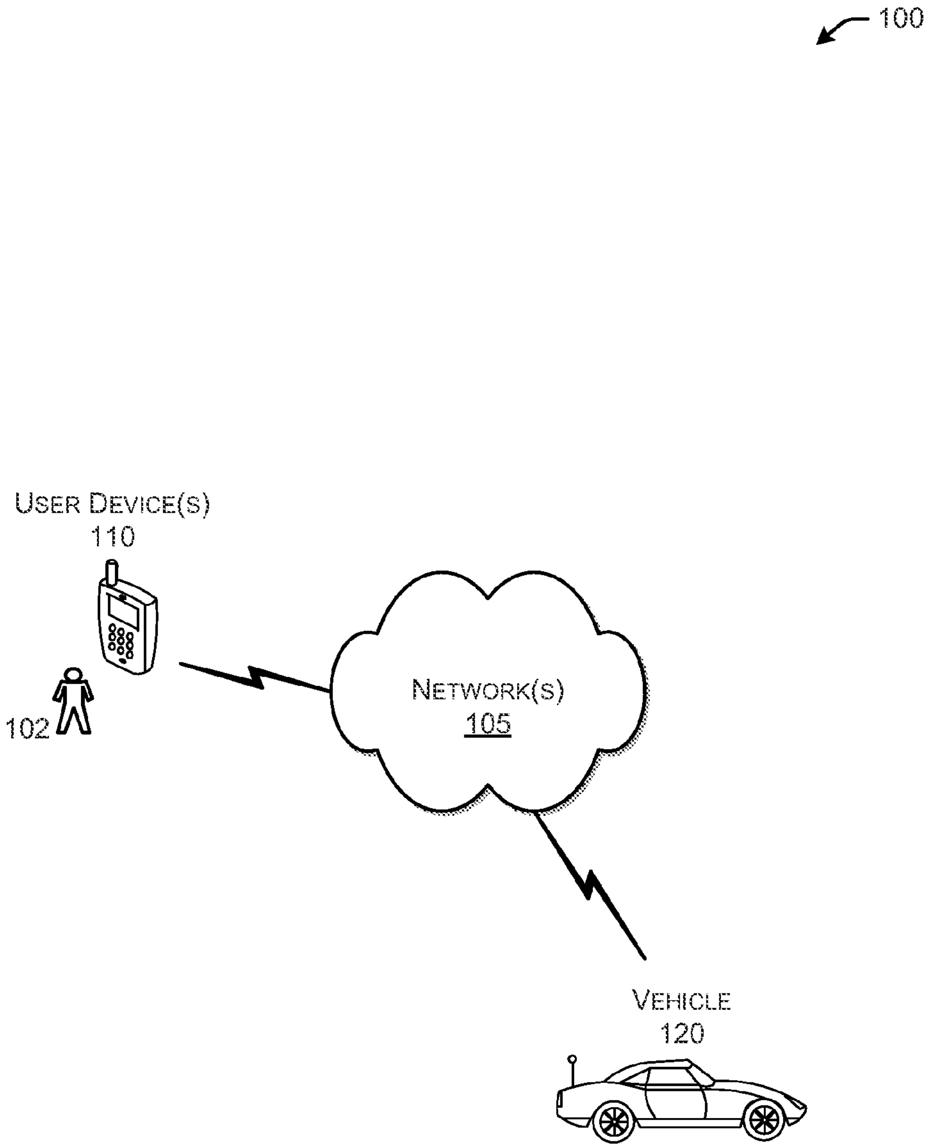
FIG. 1 is a block diagram of a configuration for enabling communication between a vehicle and a user device, according to one embodiment of the disclosure.

FIG. 1 illustrates an example configuration for implementing remote management and control of vehicular functions. The configuration may include, but is not limited to, one or more user devices 110 and one or more vehicles 120. A vehicle 120 may include one or more systems that include one or more processing devices for implementing functions and features associated with the vehicle, as will be discussed in greater detail below. Communication between a vehicle 120 and a user device 110 may occur over multiple types of networks 105, such as a wireless fidelity (WiFi) network, a WiFi Direct network, Bluetooth®, a radio network, a cellular network third generation or fourth generation), a satellite network, a cable network, a landline-based network, the Internet, intranets, a telephone network, a television network, data networks, or other communication mediums connecting multiple computing devices to one another, as non-limiting examples. According to certain embodiments herein, multiple networks may be leveraged by a vehicle 120 and/or a user device 110 to enable communication between them.

As used herein, a "device" may refer to any computing component that includes one or more processors that can be configured to execute computer-readable, computer-implemented, or computer-executable instructions. Examples of such devices may include, but are not limited to, personal computers, server computers, smart phones, digital assistants, personal digital assistants, digital tablets, Internet appliances, application-specific circuits, microcontrollers, or minicomputers. In some embodiments, the execution of suitable computer-implemented instructions by one or more processors associated with various devices may form special purpose computers or other particular machines that may facilitate the remote management or control of vehicular functions. As used herein, the term "user device" described in association with communicating with a vehicle is not meant to limit vehicular communication to that involving a device operated by a user or owner of a vehicle. A user device may be a type of device as described above and may not require a user or a particular user-friendly interface on a display for facilitating the management and control of vehicular functions as described herein.

Figure 2:
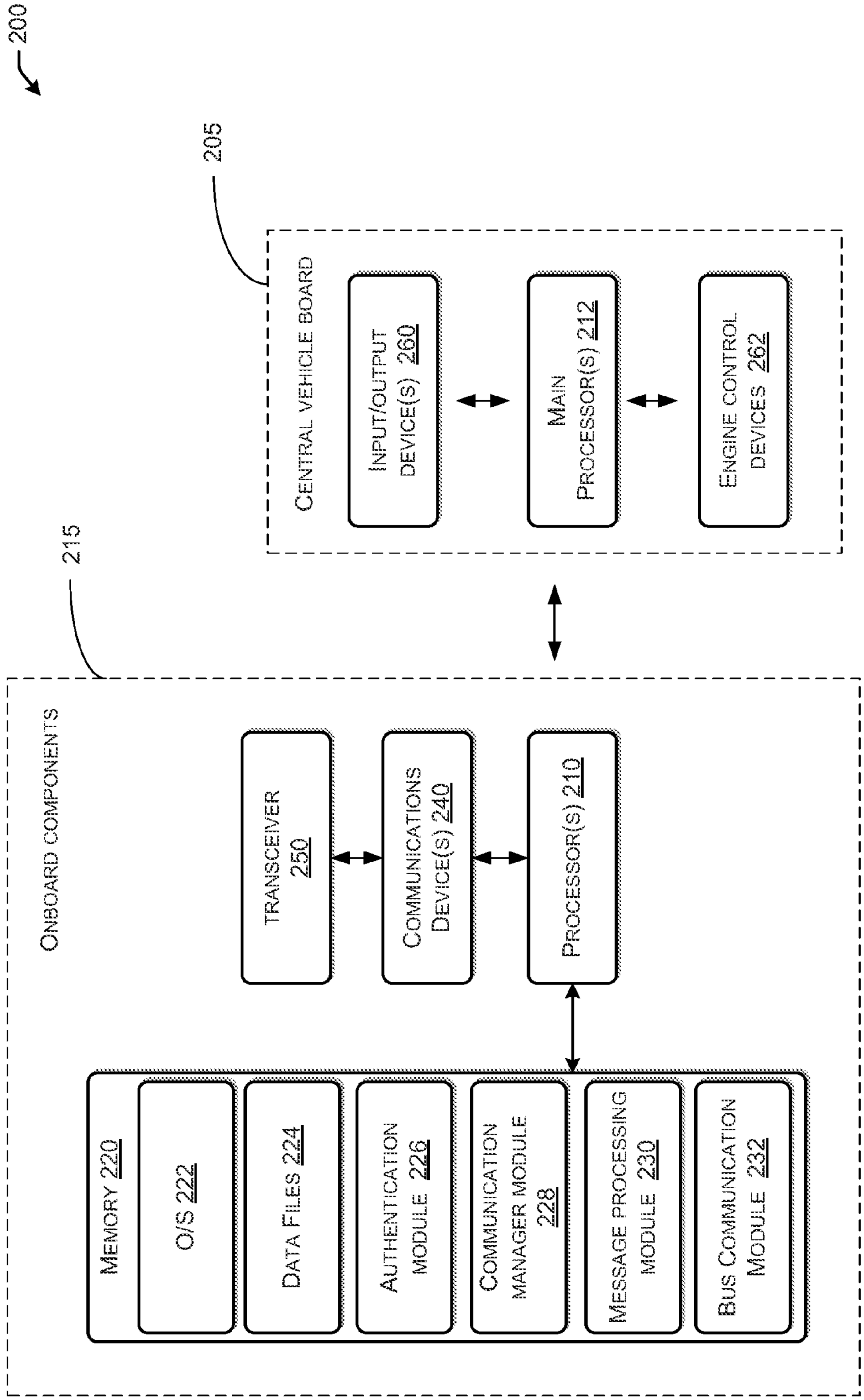
FIG. 2 is a diagram of an example vehicle computing system including multiple system boards, one of which may enable the remote management and control of vehicular functions, according to one embodiment of the disclosure.

FIG. 2 depicts a block diagram of an example vehicle computing system 200 in a vehicle, e.g., vehicle 120 in FIG. 1, for implementing remote management and control of vehicular functions, among other things. As shown in FIG. 2, multiple vehicle systems may exist. For example, a computing system 205 may exist or controlling a vehicle's standard devices or components, which may include engine devices, braking devices, power steering devices, door control devices, window control devices, etc., in one embodiment. The computing system 205 may also include various input/output ("I/O") devices 260 that may exist in a vehicle, such as image sensors or collection devices (e.g., cameras, both interior-facing cameras for capturing images within a vehicle and exterior-facing cameras for capturing images from a vehicle's surroundings) and display devices, such as light-emitting diode ("LED") displays and organic light-emitting diode ("OLED") displays, as non-limiting examples. A main processor 212 may communicate with the standard engine control devices 262 and I/O devices 260 to activate the devices, send information to these devices, or collect information from these devices, as non-limiting examples.

The computing system 205 may be in communication with the customized system 215. In certain embodiments, the system 215 may include an in-vehicle infotainment (IVI) system or a telematics system. As used herein, an IVI system may refer to a system in a vehicle that provides entertainment and informational features for the vehicle. A telematics system may refer to the technology of sending, receiving, and storing information via telecommunication devices in conjunction with effecting control on remote objects in a vehicle. Such systems may include devices to support such functionality, such as stereo systems, navigation systems, etc. In certain embodiments herein, devices related to the implementation of remote management and control of vehicular functions may exist onboard an IVI or telematics system such that the functionality described herein may be associated with the IVI or telematics system. In other embodiments, the functionality described herein may reside independently of other systems or may be associated with various other systems.

The customized system 215 may include, but is not limited to, a processor 210, a memory 220, one or more communication devices 240, and a transceiver 250. The processor 210 may communicate with the communication devices 240 in the customized system 215. For example, the processor 210 may communicate with the memory 220 to execute certain computer-executable instructions or modules, such as 226, 228, 230, 232, stored in the memory 220 to facilitate the remote management and control of vehicular functions as described herein. In one embodiment, the processor 210 may also communicate with the one or more communication devices 240 to send and receive messages from various types of networks, such as those listed above. A transceiver 250 may facilitate the sending and receipt of such messages. In some embodiments, a transmitter and a separate receiver may be utilized to send and receive messages, respectively.

According to certain embodiments herein, the processor 210, the memory 220, the communication devices 240, and the transceiver 250 may be onboard a system board (hereinafter "onboard") in the customized system 215, such as an IVI or telematics system board. In this way, these devices may operate out of band, or with access to only minimal power, such as in association with a vehicle shutdown, hibernation, or standby, as non-limiting examples. In one example, a backup battery may be used to provide sufficient power to enable the devices in the customized system 215 to operate out of band. Thus, the devices in the customized system 215 may remain awake (e.g., after a vehicle has been shutdown) and may provide certain functionality, such as communicating with a user device, e.g., user device 110 to send and receive messages in association with remote management and control of vehicular functions. Such functionality may be referred to herein as out of band or operating out of band. The devices in the customized system 215 may also communicate with one another while operating out of band. The processor 210 may, for example, may communicate with the memory 220 to execute computer-executable instructions or modules therein while operating out of band.

The devices and/or program modules in the computing system 205 may shut down when a vehicle is powered down, for example, and therefore may not operate out of band. For example, a main operating system (not shown) that may control standard components in a vehicle, such as an engine, brakes, doors, windows, hard disks, or other devices in communication with the main operating system or one of its program modules, may not be operational when the vehicle is shut down. The O/S 222 in the memory 220, however, may be operational when the vehicle is shut down, or otherwise in a low power state such as hibernation or standby, because it may be located onboard or at the board level in firmware, according to certain embodiments herein. Such a configuration may enable devices in the customized system 215 to send messages, receive messages, and cause the performance of vehicular functions. As an example, according to certain embodiments, the processor 210 of the customized system 215 may communicate with the main processor 212 (and/or other devices) of the computing system 205 to wake the main processor 212 so that it may cause performance of the functions requested by a user via one or more action codes. In one embodiment, such communication may occur via the CAN BUS protocol, as will be described in greater detail below.

In certain embodiments, the processor 210 of the customized system 215 may also communicate with the main processor 212 and/or other devices of the computing system 205 in response to executing computer-executable instructions in the message processing module 230 to identify a vehicular function associated with an action code. In certain embodiments, a manufacturer may determine at least a portion of a vehicle's functions that may be remotely managed or controlled. Such functions may be stored in firmware in association with the computing system 205 or other system not onboard customized system 215, in one example. As used herein, firmware may refer to a combination of read-only memory and program code and data stored in it. In one example, the memory 220 including the data files 224, and the program modules 226, 228, 230, and 232 may be a read-only memory. In this way, the program modules stored in the memory 220 may be less susceptible to tampering or deactivation, thereby facilitating a more secure, reliable system for implementing the features described herein. The message processing module 230 (or other modules) may interface with the firmware including the accessible functions to determine a vehicular function associated with the action code and cause activation or performance of the function. According to one configuration, the action code may be received in binary encoded format, such as compiled code that, when decoded, may be executed or interpreted by the message processing module 230 to perform according to the binary code.

The processors 210 and 212 may include any number of suitable processing devices, such as a central processing unit ("CPU"), a digital signal processor ("DSP"), a reduced instruction set computer ("RISC"), a complex instruction set computer ("CISC"), microprocessor, a microcontroller, a field programmable gate array ("FPGA"), or any combination thereof. In one embodiment, the system 200 may be based on an Intel® Architecture system, and the processors 210 and chipset may be from a family of Intel® processors and chipsets, such as the Intel® Atom® processor family. The processor 210 may also include one or more processors as part of one or more application-specific integrated circuits ("ASICs") or application-specific standard products ("ASSPs") for handling specific data processing functions or tasks. Additionally, any number of suitable I/O interfaces and/or communications interfaces (e.g., network interfaces, data bus interfaces, etc.) may facilitate communication between the processors 210 and other components of the system 200.

The one or more communication devices 240 may facilitate communications between the system 200 and other devices that may be external to a vehicle containing the system 200. For example, the one or more communications devices 240 may enable the system 200 to receive messages from a user device 110 and/or send messages to a user device 110 as illustrated in FIG. 1. The communication devices 240 may enable various types of communications over different networks, such as wireless networks including, but not limited to, a wireless fidelity (WiFi) network, a WiFi Direct network, a radio network, a cellular network, a GPS network, a ZigBee® connection, a Bluetooth® channel, proprietary protocol connections, and other wireless links, as well as hardwired connections, serial link connections, parallel link connections or combinations thereof.

According to various configurations, one or multiple interface cards or circuits may support the multiple networks named above. In one embodiment, such one or more interface cards or circuits may be onboard such that firmware in the memory 220 may access and control communications associated with the customized system 215. In one example, the firmware code the communication manager module 228, as will be described below) may monitor each of the communication channels associated with the interface cards for messages. As messages are received via certain networks, the interface card corresponding to the network over which the message was received may be accessed to retrieve the message.

The communication manager module 228 may also said messages using one or more interface cards associated with the various types of networks. As will be described below, the communication manager module 228 may prioritize which channels to use for sending information based on various criteria. In addition to onboard interface cards, externally facing devices may also be used to communicate messages over various types of networks.

Turning now to the contents of the memory 220, the memory 220 may include any number of suitable memory devices, such as caches, read-only memory devices, random access memory ("RAM"), dynamic RAM ("DRAM"), static RAM ("SRAM"), synchronous dynamic RAM ("SDRAM"), double data rate ("DDR") SDRAM ("DDR-SDRAM"), RAM-BUS DRAM ("RDRAM"), flash memory devices, electrically erasable programmable read only memory ("EEPROM"), non-volatile RAM ("NVRAM"), universal serial bus ("USB") removable memory, magnetic storage devices, removable storage devices (e.g., memory cards, etc.), and/or non-removable storage devices. As desired, the memory 220 may include internal memory devices and/or external memory devices in communication with the system 200.

The memory 220 may store data, executable instructions, and/or various program modules utilized by the processor 210. Examples of data that may be stored by the memory 220 include data files 224 and any number of suitable program modules and/or applications that may be executed by the processor 210, such as, but not limited to, an operating system ("OS") 222, an authentication module 226, a communication manager module 228, a message processing module 230, and a bus communication module 232. Each of these modules may be implemented as individual modules or, alternatively, one or more of the modules may perform all or at least some of the functionality associated with the other modules. In certain embodiments, these modules may be stored as firmware in a read-only memory 220, thereby making it more difficult for the functions described herein to be tampered with or disabled.

The data files 224 may include any suitable information that may facilitate the remote management and control of vehicular functions. Example information may include, but is not limited to, information that may be used to authenticate a message (e.g., private keys, public keys, or other encryption keys), information that may be used to authenticate a user's access rights to perform certain management and control features (e.g., user name, password, pass codes, etc.), tracking information associated with requests from user devices and responses to such requests performed by a vehicle, as well as other information that may facilitate the processes described herein.

The operating system 222 may include a suitable module or application that facilitates general operation of the system 200, as well as the execution of other program modules illustrated in the memory 220 in FIG. 2.

The authentication module 226 may perform various functions related to authentication of a message, a user or user device attempting to manage or control a vehicle's functions, and a connection to a network for communication with a user device, as non-limiting examples. To authenticate a user, the user's access credentials, such as a user name and password, may be authenticated to determine whether the user may interact with the vehicle and, if so, to which vehicular functions the user may have access. Thus, different users may have different access rights to interact with a vehicle. In one example, certain users may be restricted to interact with certain types of functions. Example types of functions may include engine-related features those functions that may control devices or components associated with a vehicle's engine, such as decelerating an engine), presentation-related functions (e.g., activating video cameras or speakers in the vehicle), entry/exit-features (e.g., locking or opening doors, compartments, etc., in the vehicle), as well as other groups or categories of functions that may exist in a vehicle. For example, an owner may have access to each of the example function types described above, whereas an owner's child, who may also have a user account to interact with the vehicle, may be unable to interact with a vehicle's engine-related functions.

The authentication module 226 may also authenticate a vehicle's access to various networks for communicating with a user device. For example, networks such as Bluetooth® or WiFi, may require a login and password or other identifying information to access the network. The communications manager module 228 may access such information in the data files 224, for example, and provide the information to the requesting device or system to gain access to the protected and/or secured network.

The authentication module 226 may also authenticate messages received from a user device to, for example, verify that the message has not been tampered with by a third party, for example. Such verification may include decoding or decrypting a message that was encoded at the user device. If a message is successfully authenticated, it may be considered a valid message and processing may continue. Various techniques may be employed to authenticate a message including, but not limited to, cryptographic hash functions (e.g., HMAC), block cipher algorithms (e.g., OMAC, CBC-MAC, and PMAC), and other techniques that may rely upon a private key, public key/private key derivation, secret keys, or other techniques that may encode information such that only an intended device may decrypt the message.

In some embodiments, an encoding module may exist for encoding or encrypting a message prior to sending the message to a user device. Such encoding techniques may be performed by the techniques named above, in one example.

The communication manager module 228 may perform a number of functions to facilitate communications between the system 200 and various other devices, such as a user device 110 in FIG. 1. As described above, the communication manager module 228 may communicate with one or more communication devices 240, such as network interface cards, to receive and send messages to user devices using multiple types of networks. In association with such communication, the communication manager module 228 may determine a network among multiple available networks for communicating with a device, may prioritize the networks according to various criteria, and may send messages over a selected network to a vehicle, for example.

Example criteria that may be used to prioritize networks may include a predetermined ranking of networks. Such a predetermined ranking may be based on historical information associated with reliability, transmission speed, and other performance indicators associated with various networks. Other example criteria may be based on results from triangulation or localization techniques, the signal strength or availability of a network as determined by a vehicle at its present location, whether a network is protected (e.g., requires authentication), whether a network is secured (e.g., encrypts at least a portion of the communication between devices), the amount of power required to transmit a message over a network, etc.

In certain embodiments, all or a portion of the available communication channels may be utilized simultaneously to communicate messages between a vehicle and a user device. For example, upon the communication manager module 228 detecting the available of a WiFi network, a cellular network, and a radio network, the communication manager module 228 may receive or send a message over each of these networks. The technical effect of such functionality may include redundant communications that may improve the reliability of data transmission between the vehicle and the user device.

Messages received by the communication manager module 228 may include messages from user devices that may include one or more action codes. Such actions codes may correspond to respective functions associated with a vehicle such that, when the action codes are processed, e.g., by the message processing module 230, the vehicle may perform the respective function associated with the action code. In one embodiment, upon receiving a message, the communication manager module 228 may send an acknowledgement ("ACK") to a user device to confirm receipt of a message.

The communication manager module 228 may also format messages to prepare them for delivery to a user device, for example. According to one example, the message processing module 230 may append information to video content that is captured by a video capture device, such as a video device associated with I/O devices 260. Various information may be appended to the video content, such as the location of the vehicle GPS location), the date/time that the video content was captured, etc. As another example, status messages may be constructed to provide a device with a status of the vehicle or other information associated with the vehicle. Numerous other examples of formatting content to be sent to a device, such as the user device 110, may exist in other embodiments.

The message processing module 230 may process messages received from one or more user devices, such as the user device 110. Such messages may include one or more action codes, which may correspond to a respective function associated with a function in a vehicle. The message processing module 230 may parse the received message to identify the action code in the message and determine the vehicular function corresponding to the action code. Upon identifying the vehicular function, the message processing module 230 may cause performance of the determined function and may generate a status message, which may be sent to a user device to inform the user about the performance of the requested vehicular function.

The message processing module 230 may also store various information, such as information associated with the performance of user-requested action codes in a vehicle. Examples of such stored information may include, but are not limited to, messages received from a user device, an identification of a user and the user device that sent the message, the status of a request associated with the message (e.g., completed, pending, or failed), the response message generated by the vehicle, etc. The information may be stored in the memory 220, data files 224, or in an external memory accessible by the processor 210, as non-limiting examples.

One or more bus communication modules 232 may include various protocols that may be used by devices in the system 200 to communicate with one another. An example protocol may be the CAN (controller area network) BUS protocol, in which communication occurs between devices over a controller area network without a host computer device. For example, the processor 210 may use the CAN BUS protocol to communicate with a main processor 212 to wake the main processor 212 and instruct it to activate an I/O device 260, in one example. Protocols in addition to the CAN BUS protocol, such as other message-based protocols, may be used in other embodiments. In other examples, a chipset (not shown) may be provided to control communications between the devices in the vehicle computing system 200.

In addition to or alternative to the memory 220, other embodiments may include one or more suitable computer-readable media that may be provided for storing computer-executable instructions such as those stored in the memory 220. One or more processing devices, such as the processor 210, may execute such computer-executable instructions to facilitate the remote management of a vehicle, as described above in association with the modules 226, 228, 230, 232, in the memory 220. As used herein, the term "computer-readable medium" may describe any form of suitable memory or memory device for retaining information in any form, including various kinds of storage devices (e.g., magnetic, optical, static, etc.). Indeed, various embodiments of the disclosure may be implemented in a wide variety of suitable forms.

Figure 3:
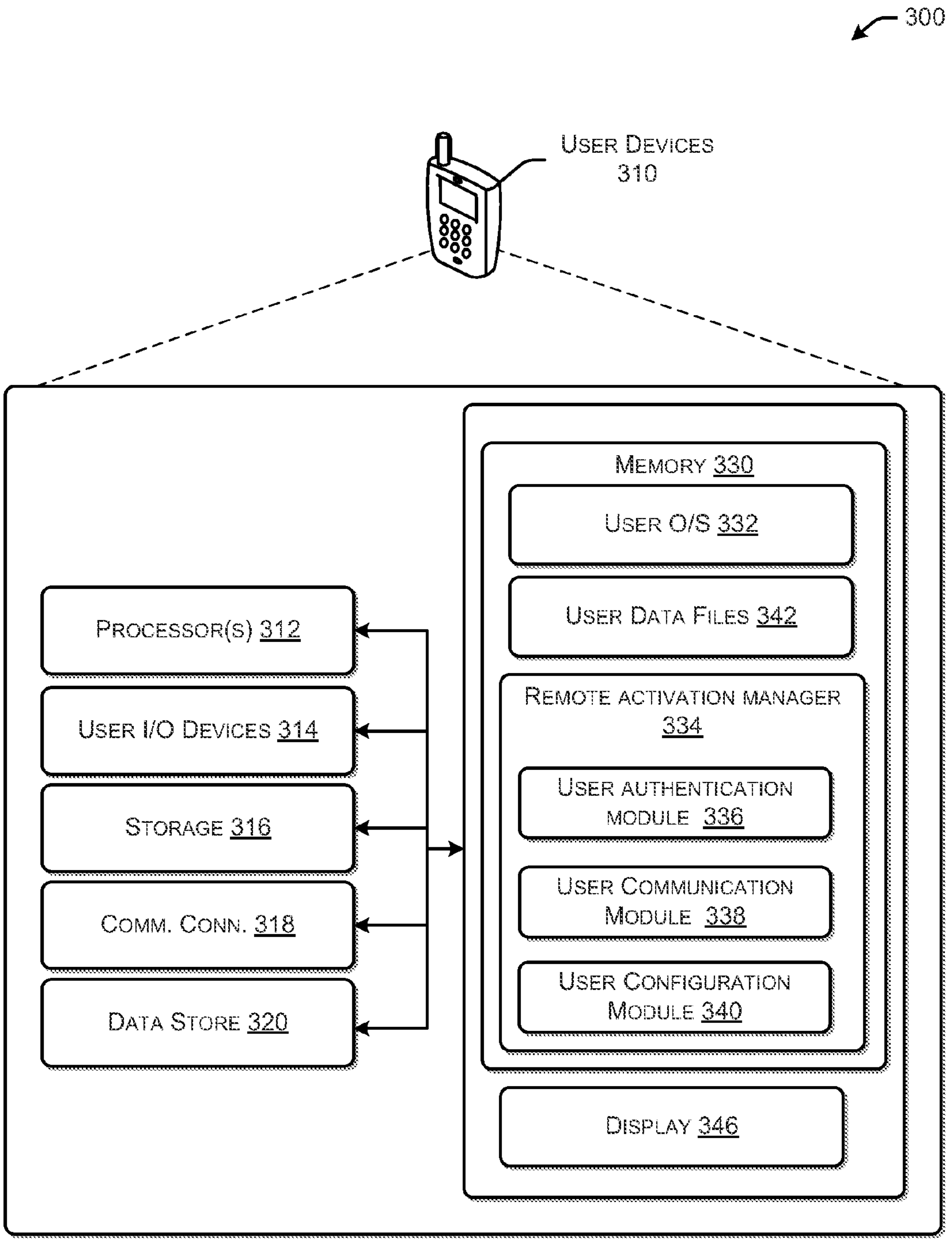
FIG. 3 is a block diagram of a user device configuration for enabling a user device to remotely manage and control a vehicle, according to one embodiment of the disclosure.

FIG. 3 depicts an example configuration of a user device 310 for communicating with a vehicle, according to one embodiment of the disclosure. The example user device 310 illustrated in FIG. 3 may include one or more processors 312 that are configured to communicate with one or more memory devices 330, one or more user input/output ("I/O") devices 314, storage 316, one or more communication connections 318, and one or more data stores 320.

The processor 312 may be implemented as appropriate in hardware, software, firmware, or combinations thereof. Software or firmware implementations of the processor 312 may include computer-executable or machine-executable instructions written in any suitable programming language to perform the various functions described herein. In one embodiment, the processor 312 may be similar to the processor 210 described in FIG. 2.

The memory 330 may store program instructions that are loadable and executable on the processor 312, as well as data generated during the execution of these programs, in certain embodiments, the memory 330 may be similar to the memory 220 described in FIG. 2.

The storage 316 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices.

The memory 330 and the storage 316, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The one or more communication connections 318 may allow the user device 310 to communicate with other devices, e.g., a device in the vehicle 120 in FIG. 1, databases, user terminals, and various other devices that may exist on the one or more networks 105. In certain embodiments, a user device 310 may be configured to communicate simultaneously over multiple communication channels. For example, upon detecting the availability of a WiFi network and a cellular network, the user device 310 may receive and send messages over both the WiFi network and the cellular network at the same time. The technical effect of such a configuration may include increased redundancy, and hence reliability, for communicating messages between the user device and another device.

The user I/O devices 314 may enable a user to interact with the user device 310. Such I/O devices may include, but are not limited to, a keyboard, a mouse, a pen, a voice input device, a touch input device, a display, a camera or imaging device, speakers, or a printer.

The one or more data stores 320 may store lists, arrays, databases, flat files, etc. In some implementations, the data store 320 may be stored in memory external to the user device 310 but accessible via the one or more networks 105. The data stores 320 may store information associated with command codes and/or other information that may facilitate implementation of the processes described herein.

Each of the devices and program modules illustrated in FIG. 3 may operate at the board level, or onboard, in one embodiment. As described above, such operation may enable the user device 310 to communicate with other devices, such as the vehicle 120 shown in FIG. 1, while having access to only a minimal amount of power, which may occur when the user device 310 is shut down, in hibernation, or in standby mode.

Turning to the contents of the memory 330, the memory 330 may include a user operating system ("OS") 332, user data files 342, and various software applications and/or modules that may implement the remote activation of vehicular functions. Example modules may include a user authentication module 336, a user communication module 338, and a user configuration module 340. Each of these modules may be implemented as individual modules within a remote activation manager 334 that provides specific functionality associated with managing a vehicle from a user device. Alternatively, one or more of the modules 336, 338, 340 may perform some or all of the functionality associated with the other modules.

In one embodiment, the remote activation manager 334 may be a dedicated application program or part of a dedicated application program that enables the user device 310 to communicate directly with a vehicle, e.g., a vehicle 120, via different types of networks, such as those described herein. In another embodiment, the remote activation manager 334 may include a web browser that may interact with a wireless portal that may facilitate communication between the user device and vehicle, as will be discussed in greater detail below. The remote activation manager 334 may render presentation of information associated with the remote activation of vehicular functions in a display 346. The information may be presented in the form of a GUI that may present various content, information, data, etc., that may enable a user utilizing the user device 310 to interact with a vehicle. For example, the authentication module 336 may facilitate verification of a user's access permissions or rights to interact with a vehicle. In one example, such verification may include the user authentication module 336 sending a user's login and password credentials to a vehicle, where the credentials may be verified as described above.

A user authentication module 336 may authenticate a user's access rights to manage or control one or more vehicular functions. A user authentication module 336 may authenticate a user based on one or any combination of a user name, password, personal code, or user device identifier, as non-limiting examples. In one embodiment, the user authentication module 336 may send the user access information to a server, where the user's access rights may be determined.

The user communication module 338 may include various communication interfaces or components that may enable the user device 310 to communicate with a vehicle. Such interfaces or components may include Short Message Service (SMS) text messaging, Internet web pages, or other interfaces that may allow communication from a user device 310 using Bluetooth®, a digital radio network, a cellular network (e.g., third generation and/or fourth generation), a WiFi network, a satellite network, etc.

In one example, an SMS network may communicate SMS text messages between a user device, such as a smart phone, and a vehicle via a centralized server in the SMS network, in one example. The user communication module 338 may include suitable program code for facilitating such communication at a user device.

In another example, instead of a dedicated application, the user device 310 may include a web browser for interacting with a web server that may communicate messages between the user device 310 and the vehicle. According to one configuration, the web server may be a wireless portal, e.g., a website designed to communicate messages from web browsers via a cellular network or other network. The user communication module 338 may include suitable program code that may enable a user device 310 to communicate with the wireless portal. Such communication may include the wireless portal authenticating a user utilizing the user device 310 prior to enabling communication with a vehicle, such as vehicle 120 shown in FIG. 1. The wireless portal may also provide a GUI interface for interacting with a vehicle 120. A user may utilize the GUI interface to specify configurations or actions that may activate a corresponding function in a vehicle.

The user configuration module 340 may enable a user utilizing a user device 310 to configure various parameters or settings for a vehicle in association with implementing the features described herein. For example, a vehicle may be configured to perform a function in response to receiving and processing an action code associated with the feature from a user device. Numerous functions or features associated with a vehicle may be configured. Each of these functions may have their own particular parameters or settings, which may be specified by a user interacting with a GUI provided by the user configuration module 340.

Figure 4:
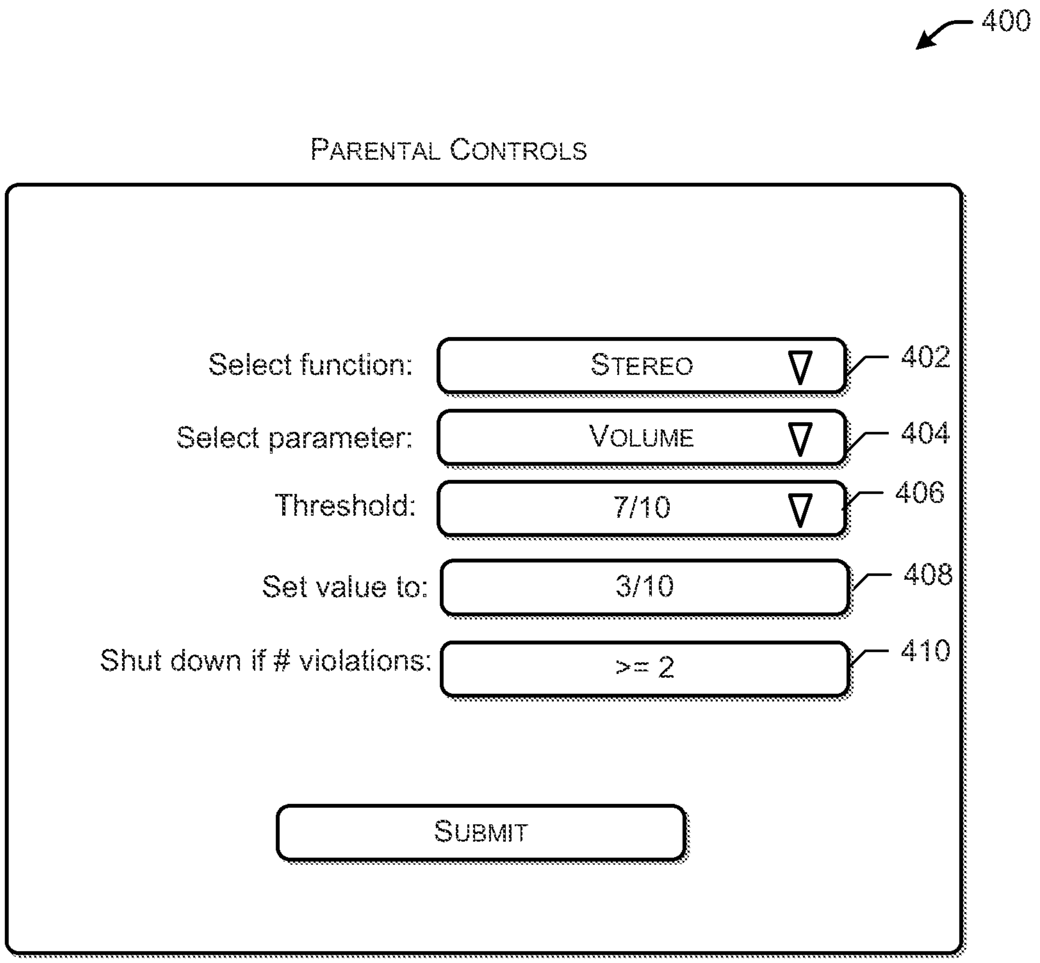
FIG. 4 is an example schematic diagram illustrating a graphical user interface ("GUI") for configuring a vehicle for parental controls, according to one embodiment of the disclosure.

As an example, FIG. 4 illustrates a configuration that may be performed for implementation of a parental control at a vehicle, such as vehicle 120 in FIG. 1. As used herein, parental controls may refer generally to higher authority control over vehicles, such as that which may be exhibited by a parent controlling a child's use of a vehicle or by a vehicle fleet manager controlling a user's use of a vehicle associated with a particular fleet. As an example of an implementation of a parental control, a user, such as a parent, may select to configure the stereo function in a vehicle in selection box 402. A user may also select the "volume" parameter at box 404 to control the volume parameter of the stereo. A threshold value may be selected at box 406 which, in the present example, may be "7/10" or a relatively loud volume. A user may configure a value in response to the remote management and control system (e.g., parental control system) at the vehicle detecting a violation of the established volume. The new value, "3/10" or a relatively low volume, may be indicated in selection box 408.

A user may select an additional action to be performed by the vehicle, such as playing an audio message warning the driver of the vehicle not to exceed the threshold value of "7/10." If the violation occurs again, the user may configure the vehicle to shut down, at box 410, according to the present example. In one embodiment, the user configuration module 340 may create such a format by compiling a script or program code that it may generate based on the sequence of actions identified by a user in FIG. 4, for example. The binary formatted information may be encoded using various encoding or encryption techniques discussed above, stored at the user device 310 as an action code as described herein, and sent to a vehicle using one or more of multiple available networks. The action code or configuration may be executed as firmware at the vehicle, in one embodiment. Other formats for the action code may exist in other embodiments, such as formatted text, as a non-limiting example.

The above configuration of a vehicle may have the following effect. A driver of the vehicle may increase the vehicle's stereo volume to "8/10." In response, the vehicle may respond by reducing the stereo volume to "3/10" and playing an audio message stating that the stereo will be powered down if the volume threshold of "7/10" is exceeded. Various text-to-speech software and systems may exist in a vehicle to present such a message, in one embodiment. After the driver again exceeds the threshold value of "7/10," the vehicle may respond as configured by shutting down the vehicle's stereo, e.g., via the message processing module 230 (in association with box 410).

Figure 5A:
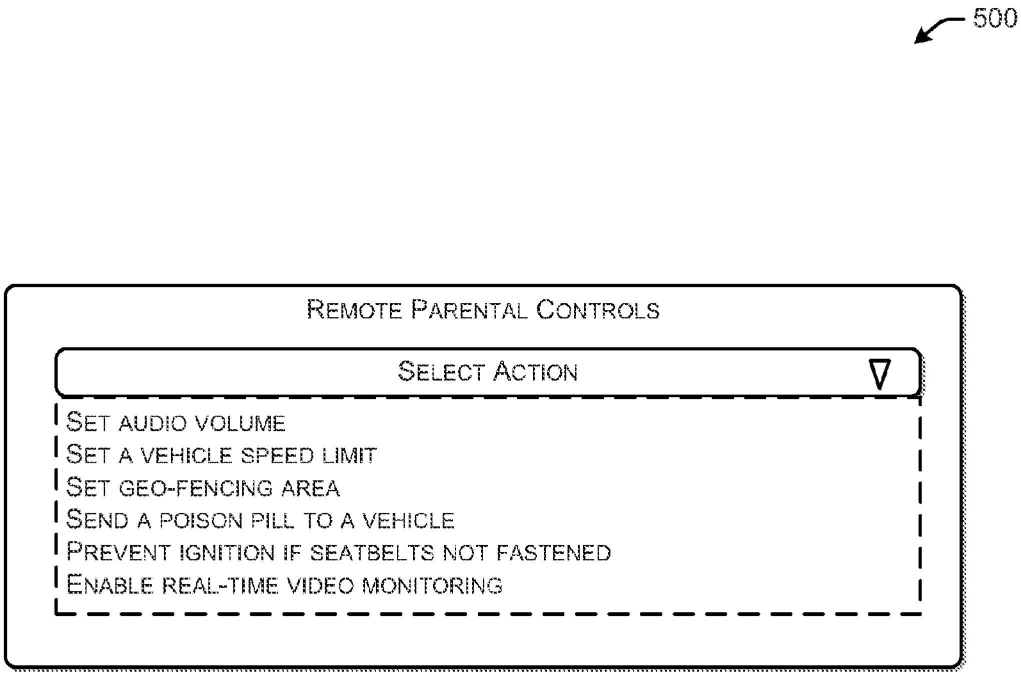
FIG. 5A is a schematic diagram of example parental control features, according to one embodiment of the disclosure.

Additional examples of parental controls are shown in FIG. 5A. Each of the descriptions shown therein may be configured in similar fashion to that described above for FIG. 4. Thus, upon selecting a configuration for any of these descriptions, an action code may be generated and sent to a vehicle, where it may be processed to cause the performance of one or more functions associated with parental controls, such as those shown in FIG. 5A.

As an example in FIG. 5A, a vehicle owner or other user may configure a speed limit for a vehicle. When a vehicle receives an action code associated with this function, the vehicle may be configured to reduce its speed when a predetermined speed limit has been exceeded, in one example.

As another example in FIG. 5A, a poison pill action code may be sent to a vehicle, which may configure the vehicle to gradually reduce its speed and stop within a given amount of time (e.g., 30-60 seconds). Any number of additional functions may be associated with implementing a poison pill. For example, the vehicle may be further configured for immobilization based on certain determinations, in one embodiment. As a non-limiting example, if an alcohol or drug identification system has indicated that alcohol or drugs may be present in a vehicle, the vehicle may be immobilized. The poison pill action code may further configure the vehicle to present audible messages to a driver of a vehicle and perform a number of additional functions based on context, for example. In one embodiment involving parental controls, a poison pill may configure a vehicle to play an audible message instructing the driver to exit the road to a safe location. A poison pill implemented in association with a stolen vehicle, however, may configure the vehicle to lock a vehicle's doors and immobilize the vehicle from further travel irrespective of the interior conditions in the vehicle. Numerous other functions and examples may exist in other embodiments.

As another example in FIG. 5A, a vehicle may be configured to perform certain functions if the vehicle exceeds a predetermined geographical range indicated by a vehicle owner or user. For example, a vehicle may be configured to stop and send its GPS coordinates if the vehicle exceeds the predetermined geographical range.

Other examples may include configuring a vehicle to prevent ignition of the vehicle if one or more seatbelts are not fastened in the vehicle and to capture real-time video images of its surroundings and stream such images to a user device requesting such information. Numerous other examples may exist in other embodiments.

Figure 5B:
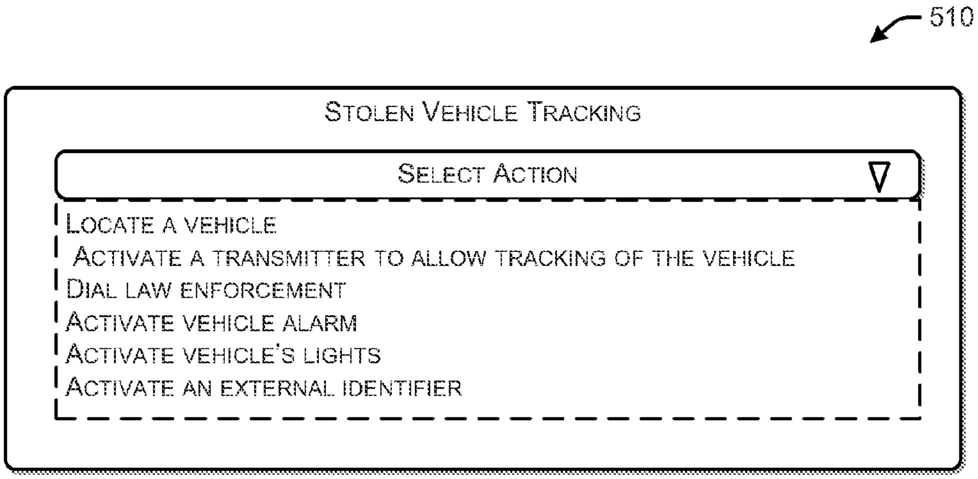
FIG. 5B is a schematic diagram of example stolen vehicle tracking features, according to one embodiment of the disclosure.

As shown in FIG. 5B, a vehicle may perform a number of functions in association with stolen vehicle tracking including, but not limited to, causing the activation of a transmitter in the vehicle to allow for tracking of the vehicle, dialing law enforcement, activating an alarm associated with the vehicle, flashing lights associated with the vehicle, activating an external identifier associated with the vehicle, or various other vehicular functions that may indicate to observers that the vehicle has been stolen.

In some embodiments, a vehicle may be configured to provide its GPS coordinates upon the vehicle detecting certain conditions, such as the occurrence of an accident involving the vehicle, receiving certain button presses from an occupant of the vehicle, or detecting an attempted theft of the vehicle, as non-limiting examples.

The above examples are non-limiting. Numerous other examples associated with configuring a vehicle for remote management and control in association with implementing stolen vehicle tracking or parental controls may exist in other embodiments.

Figure 6:
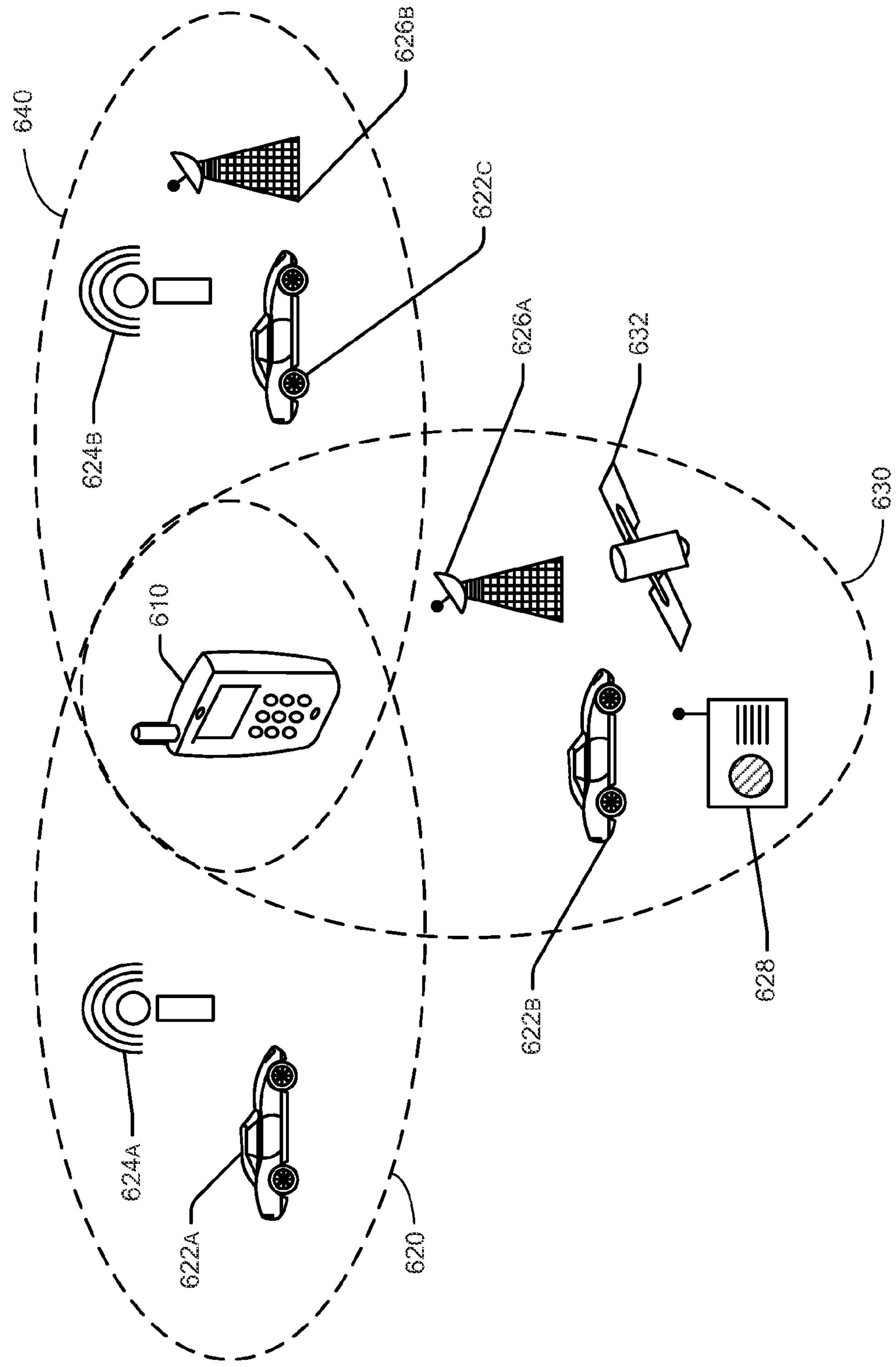
FIG. 6 is an example schematic diagram illustrating various types of networks that may be used to enable communication between a vehicle and a user device, according to one embodiment of the disclosure.

FIG. 6 is an example schematic diagram illustrating various types of networks that may be used to enable communication between a vehicle and a user device, according to one embodiment of the disclosure. As shown in FIG. 6, different types of networks may be available in different geographical areas or locations. For example, area 620 may include a WiFi network 624*a*; area 630 may include a cellular network 626*a*, a radio network 628, and a satellite network 632; and area 640 may include a WiFi network 624*b* and a cellular network 626*b*. Various other types of networks may exist in other embodiments, such as, but not limited to, those named herein.

A respective vehicle 622*a-c* may communicate with a user device 610 in each of these areas. In one example, a vehicle 622*a-c* may detect the available networks in a geographical area and determine which of the networks, if multiple networks exist, to use in communicating with a user device (e.g., via, the communication manager module 228). If multiple networks are detected, a vehicle 622*a-c* may prioritize or rank the networks for use in communicating with the user device 610. Such prioritization may facilitate the selection of a successive network in the event that a prior network fails to deliver a message from a vehicle to a user device, for example. Example criteria that may be used to prioritize networks may include a predetermined ranking of networks. As described above, such a predetermined ranking may be based on historical information associated with reliability, transmission speed, and other performance indicators associated with various networks. Other example criteria may be based on results from triangulation techniques for locating a vehicle and/or user device, the signal strength or availability of a network as determined by a vehicle at its present location, whether a network is protected (e.g., requires authentication), whether a network is secured (e.g., encrypts at least a portion of the communication between devices), the amount of power required to transmit a message over a network, etc.

As described above, a respective vehicle 622*a-c* may include any number of communication devices and modules that may enable or otherwise facilitate wireless communication over the various types of networks such as those illustrated in FIG. 6. A user device 610, such as a smart phone, may also include communication devices and modules that may enable it to communicate over these networks, as described above. Various types of techniques may be employed to determine the availability of networks in an area with respect to a wireless communication device or unit, such as that which may exist in a vehicle or a user device. As noted above, one such technique may be triangulation, where the location of a wireless communication device may be determined by measuring the Received Signal Strength Indication (RSSI), in one example.

An example of communication between vehicles 622*a-c* and the user device 610 may be as follows. A vehicle 622*a* may determine that it needs to report a breach of a predetermined geo-fencing area. In response, the vehicle 622*a* may determine that it has access to a WiFi network 624*a*, e.g., via the vehicle communication manager module 228. Because the WiFi network 624*a* is the only available network, according to the present example, the vehicle 622*a* may deliver its message to the user device 610 via, the WiFi network 624*a*. In one embodiment, communication of messages using a WiFi network may involve connecting the vehicle 622*a* and/or the user device 610 to one or more hotspots or access points. The vehicle 622*a* may connect to a hotspot or access point to obtain a message from the user device 610, which may include an action code for execution by a processor at the vehicle 622*a*. In another embodiment, the vehicle 622*a* may connect over WiFi Direct, which may enable direct communication between the vehicle 622*a* and the user device 610, e.g., without connecting through a wireless access point or hotspot. Other direct connect mechanisms, such as Bluetooth® may be used to connect a vehicle to a user device, in other examples.

In the present example, the message sent from the vehicle 622*a* to the user device 610 may include the GPS coordinates of the vehicle, as well as other information. In some embodiments, the GPS coordinates may be obtained via the GPS/GLONASS Global Positioning System or other positioning system. The user device 610 may receive the message, e.g., via the user communication module 338, and display the message for a user. A user may respond by sending an action code to the vehicle, which may cause activation of an alarm in the vehicle.

In exceeding the geo-fencing area, the vehicle 622*a* may move out of range of the WiFi network 624*a* but may come within range of different networks, such as a cellular network 626*a*, a radio network 628, and a satellite network 632 in geographical area 630. In sending updates associated with its new UPS location, the vehicle 622*a* may determine that each of the networks in geographical area 630 is available. In the present example, the vehicle (now depicted as vehicle 622*b*) may prioritize the available networks in the following order based on historical information: cellular network 626*a*, radio network 628, and satellite network 632. In the present example, the vehicle 622*b* may send its GPS coordinates via cellular network 626*a* and, upon receiving an indication that the transmission of the message failed, may transmit the GPS coordinates to the user device 610 via radio network 628, or the second option in the prioritized networks.

In response to the alarm activation, the vehicle (now depicted as vehicle 622*c*) may travel to geographical area 640 to a location within the predetermined geo-fencing area. A user utilizing user device 610 may establish a new configuration for the geo-fencing area, e.g., via user configuration module 340. The user device 610 may send the new configuration to the vehicle 622*c* via the WiFi network 624*b* or the cellular network 626*b*, in the present example.

Figure 7:
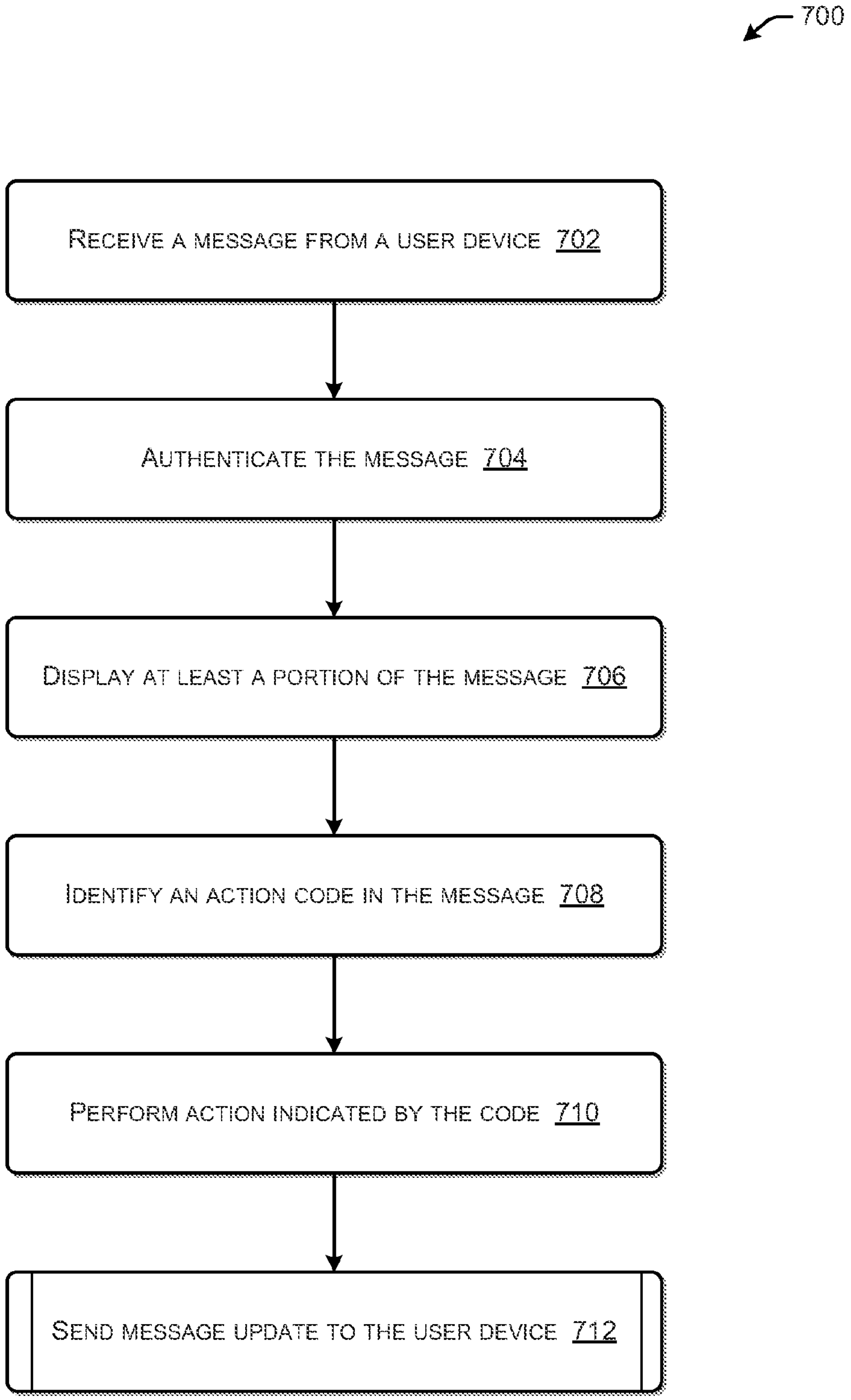
FIG. 7 is a flow diagram of a method for enabling remote management and control of vehicular functions, according to one embodiment of the disclosure.

FIG. 7 is a flow diagram of a method for enabling remote activation of vehicular functions, according to one embodiment of the disclosure. The flow diagram 700 may begin at block 702, where a message may be received at a vehicle, e.g., via the communication manager module 228. As described above, the message may be received over various types of networks, such as a WiFi network, a cellular network (including third generation and fourth generation networks), a radio network (e.g., digital radio network), a satellite network, Bluetooth®, etc. The received message may include various information, such as an action code that when executed by a processor in the vehicle may cause the vehicle to perform one or more functions corresponding to the action code.

At block 704, the message may be authenticated, e.g., via the communication manager module 228, in one embodiment. Such authentication may include decrypting a message that may have been encrypted by a user device, e.g., user device 110 in FIG. 1. The authentication may also include validating a user or sender of the message to determine whether a user may activate functions in a vehicle remotely and, if so, which functions the user may activate. If any portion of the authentication fails, processing may not be allowed to continue, according to some embodiments.

At block 706, at least a portion of the message may be displayed to a user in the vehicle, e.g., via the vehicle message processing module 230. The message may be displayed to a display device associated with I/O devices 260. An action code in the message may be identified at block 708, e.g., via the message processing module 230. In one example, the message processing module 230 may parse the action code from the message to identify the action code among other information that may be in the message.

At block 710, a feature in a vehicle may be performed, e.g., by the message processing module 230. In so doing, a processor, e.g., processor 210, may communicate with one or more devices in the vehicle to activate the requested feature. The processor 210 may use one or more protocols, such as the CAN BUS protocol, to facilitate communication with the vehicle devices. In one example, the processor 210 may execute instructions in the message processing module 230 to cause activation of a stereo system and presentation of an audio message via one or more speakers in the vehicle. In one embodiment, the stereo system (or other device) may be awakened from a sleep mode or a power off mode by the processor 210 or another device so that it may become operational.

At block 712, a vehicle may send an update to a user device that sent the message containing the action code. The processes associated with sending the update may include the processes discussed below in association with FIG. 8, in one embodiment.

Figure 8:
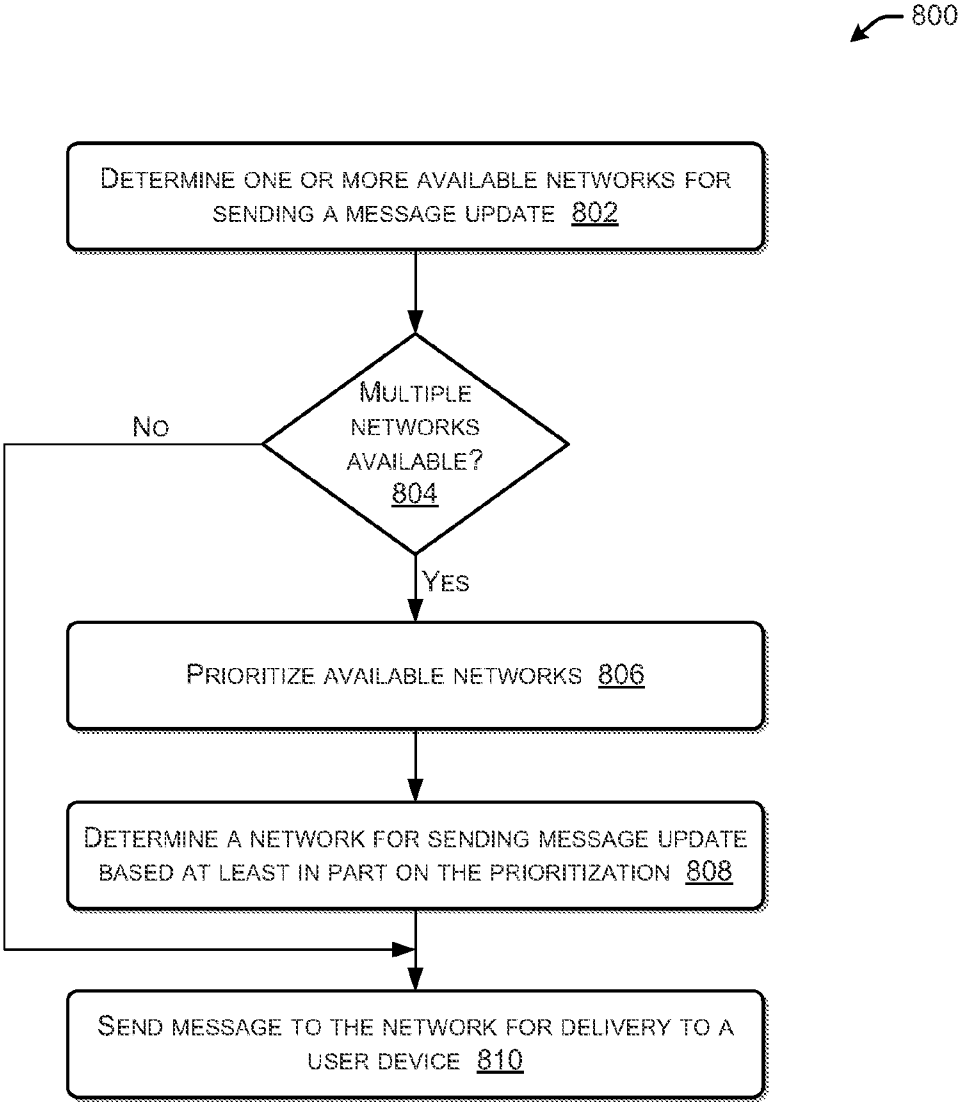
FIG. 8 is a flow diagram of a method for determining a network for communicating messages between a vehicle and a user device, according to one embodiment of the disclosure.

FIG. 8 depicts an example process 800 for sending a message from a vehicle to a user device. At block 802, a number of available networks may be determined. In one embodiment, available networks may be determined, e.g., by the communication devices 240 and associated program code and/or modules. As stated above, techniques such as triangulation, Received Signal Strength Indication (RSSI), and/or localization may be utilized to make such a determination. If multiple networks are determined to be available, at block 804, the available networks may be prioritized based on various criteria (at block 806), as discussed above. A network may be determined based on the prioritization, in one embodiment, at block 808. In one embodiment, the determination may be based on a ranking order of the networks based at least in part on the criteria described above. The updated message may be sent to the determined network for delivery to the user device, at block 810. If it is determined that multiple networks are not available, processing may proceed to block 810 without performing the prioritization and determination processes in block 806 and block 808, respectively.

Figure 9:
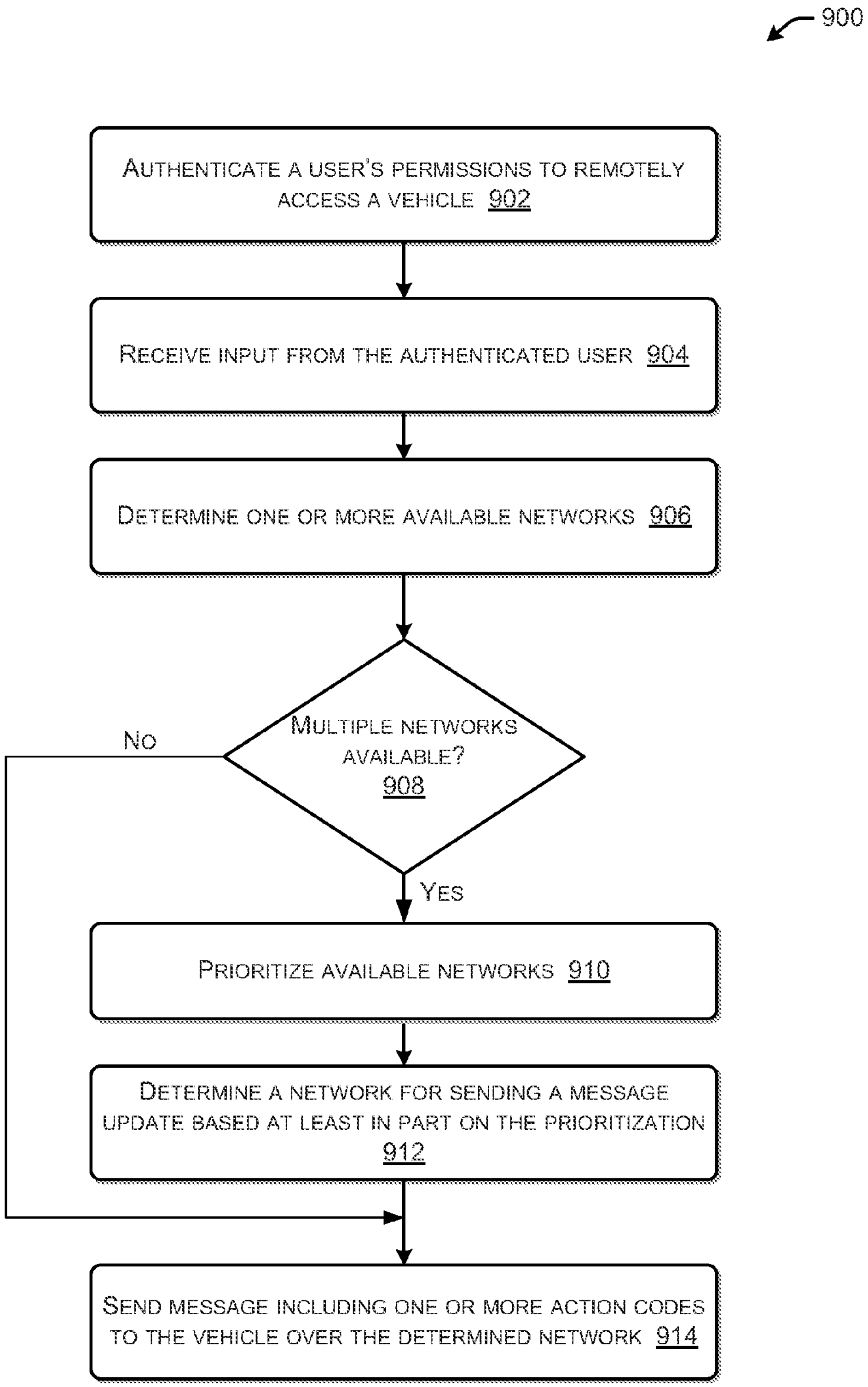
FIG. 9 is an example flow diagram for sending an action code from a user device to a vehicle, according to one embodiment of the disclosure.

FIG. 9 illustrates an example flow diagram for sending a message from a user device to a vehicle, according to one embodiment. At block 902, a user's access to a user device may be authenticated, e.g., via the user authentication module 336. In one embodiment, a user's access credentials may determine a user's access permissions to cause remote activation of certain functions in a vehicle, as described above.

A user's input, which may include an action code, may be received at block 904. The user device may determine a number of available networks for sending the message to the vehicle (at block 906), and prioritize the determined networks (at block 910) and determine a network for sending the message (Hock 912), if it is determined that multiple networks are available, at block 908. At block 914, the message, which may include one or more action codes, may be sent to a vehicle over the determined network. If it is determined that multiple networks are not available, processing may proceed to block 914 without performing the prioritization and determination processes in block 910 and block 912, respectively.

Certain aspects of the disclosure are described above with reference to block and flow diagrams of systems, methods, apparatus, and/or computer program products according to example embodiments. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, certain embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation,

What is claimed is:

1. An apparatus comprising:

at least one memory that stores computer-executable instructions:

at least one processor configured to access the at least one memory, wherein the at least one processor is configured to execute the computer-executable instructions to:

receive, over a first type of network of a plurality of types of networks, a first message comprising an action code, wherein the action code corresponds to a function associated with the apparatus;

process the action code, wherein the processing causes performance of the function;

determine that the first type of network is unavailable for communication;

determine, based at least in part on the determination that the first type of network is unavailable for communication, at least one second type of network of the plurality of types of networks for sending a second message; and send the second message over the at least one second type of network, wherein the at least one second type of network is different from the first type of network.

2. The apparatus of claim 1, the at least one processor further configured to execute the computer-executable instructions to:

receive, over a type of network of the plurality of types of networks, a configuration;

store at least a portion of the configuration in firmware; and identify the function based at least in part on the configuration.

3. The apparatus of claim 1, wherein the first message is received out of band, and wherein processing the action code comprises waking one or more devices in the apparatus associated with the function.

4. The apparatus of claim 1, the at least one processor further configured to execute the computer-executable instructions to receive, over a third type of network of the plurality of types of networks, a third message, wherein the third type of network is different from the first type of network.

5. The apparatus of claim 1, wherein the at least one memory and the at least one processor are onboard a system board, the system board associated with at least one of an in-vehicle infotainment (IVI) system or a telematics system.

6. The apparatus of claim 1, wherein the plurality of types of networks comprise at least one of a WiFi network, a WiFi Direct network, a Bluetooth® network, a cellular network, a satellite network, a radio network, or a wireless network.

7. The apparatus of claim 1, wherein the first message is encoded, the at least one processor further configured to execute the computer-executable instructions to authenticate the first message, wherein authenticating the first message verifies the content of the first message.

8. The apparatus of claim 1, wherein the message is received from a user account associated with a user device, the at least one processor further configured to execute the computer-executable instructions to authenticate the user account, wherein the authentication determines that the user account has permissions to cause the performance.

9. The apparatus of claim 1, wherein the second message comprises global positioning system (GPS) coordinates identifying a location of the apparatus.

10. The apparatus of claim 1, wherein the performance comprises at least one of activating one or more cameras associated with the apparatus, reducing the speed of the apparatus, enabling a transmitter for tracking the apparatus, or adjusting a volume for a stereo in the apparatus.

11. A method comprising:

receiving, by a user device, a request to activate a function associated with a vehicle;

generating, by the user device, an action code associated with the function, wherein the action code is based at least in part on the request;

identifying, by the user device, a first type of network for sending the action code to the vehicle, wherein the vehicle is configured to receive the action code over a plurality of types of networks;

sending, from the user device, the action code to the vehicle over the first type of network; and in response to sending the action code to the vehicle over the first type of network, receiving, by the user device, a second message from the vehicle over at least one second type of network of the plurality of types of networks, wherein the at least one second type of network is different from the first type of network.

12. The method of claim 11, further comprising authenticating, by the user device, a user account associated with the user device, wherein the authentication determines whether the user account may cause performance of the function.

13. The method of claim 11, wherein the action code, when processed by the vehicle, causes the vehicle to perform the function.

14. The method of claim 11, wherein the function comprises at least one of activating one or more cameras associated with the vehicle, reducing the speed of the vehicle, enabling a transmitter for tracking the vehicle, or adjusting a volume for a stereo in the vehicle.

15. The method of claim 11, wherein the action code is received by the vehicle out of band.

16. The method of claim 11, wherein the second message is received from the vehicle out of band.

17. The method of claim 11, wherein the plurality of types of networks comprise at least one of a WiFi network, a WiFi Direct network, a Bluetooth® network, a cellular network, a satellite network, or a radio network.

18. One or more non-transitory computer-readable media storing computer-executable instructions that, when executed by at least one processor, configure the at least one processor to perform operations comprising:

receiving, at a vehicle, a configuration over a first type of network of a plurality of types of networks;

storing, at the vehicle, at least a portion of the configuration in firmware;

receiving, at the vehicle, over the first type of network, a first message comprising an action code, wherein the action code corresponds to a function associated with the vehicle;

identifying, by the vehicle, the function based at least in part on the configuration;

processing, by the vehicle, the action code, wherein the processing causes performance of the function;

determining, by the vehicle, that the first type of network is unavailable for communication; and determining, by the vehicle based at least in part on the determination that the first type of network is unavailable for communication, at least one second type of network of the plurality of types of networks for sending a second message; and sending, by the vehicle, the second message over the at least one second type of network, wherein the at least one second type of network is different from the first type of network.

19. The one or more non-transitory computer-readable media of claim 18, wherein the second message is sent over the at least one second type of network for delivery to a user device, and wherein the at least one processor is further configured to perform the operation of:

determining that the second message was not delivered to the user device; and sending the second message to the user device over a third type of network.

20. The one or more non-transitory computer-readable media of claim 18, wherein at least one of the configuration or the first message is received out of band.

21. The one or more non-transitory computer-readable media of claim 18, wherein the plurality of types of networks comprise at least one of a WiFi network, a WiFi Direct network, a Bluetooth® network, a cellular network, a satellite network, or a radio network.

22. The one or more non-transitory computer-readable media of claim 18, wherein processing the action code comprises waking one or more devices in the vehicle associated with the function.

23. The one or more non-transitory computer-readable media of claim 18, wherein the function comprises at least one of activating one or more cameras associated with the vehicle, reducing the speed of the vehicle, enabling a transmitter for tracking the vehicle, or adjusting a volume for a stereo in the vehicle.

* * * * *